United States Patent [19]

Welschof

[11] Patent Number: 5,582,546
[45] Date of Patent: Dec. 10, 1996

[54] ENERGY ABSORBING PROPELLER SHAFT FOR MOTOR VEHICLES

[75] Inventor: Hans-Heinrich Welschof, Rodenbach, Germany

[73] Assignee: Lohr & Bromkamp GmbH, Offenbach am Main, Germany

[21] Appl. No.: 363,764

[22] Filed: Dec. 23, 1994

[30] Foreign Application Priority Data

Dec. 23, 1993 [DE] Germany .................. 43 44 177.7

[51] Int. Cl.⁶ .......................... F16D 3/221; B60K 17/22
[52] U.S. Cl. ............................................. 464/141; 464/906
[58] Field of Search ............................. 464/111, 141, 464/142, 143, 145, 172, 182, 179, 906, 183

[56] References Cited

U.S. PATENT DOCUMENTS

| | | | |
|---|---|---|---|
| 3,367,139 | 2/1968 | Ristau | 464/145 X |
| 4,202,184 | 5/1980 | Krude et al. | 464/906 X |
| 4,511,346 | 4/1985 | Hazebrook et al. | 464/906 X |
| 4,549,873 | 10/1985 | Krude | 464/141 |
| 4,767,381 | 5/1988 | Brown et al. | 464/906 X |
| 5,230,660 | 7/1993 | Warnke | 464/906 X |
| 5,334,096 | 8/1994 | Iwao | 464/906 X |

OTHER PUBLICATIONS

German Automobiltechnische Zeitschrift 95 (1993) 7/8, pp. 330 through 337.

*Primary Examiner*—Daniel P. Stodola
*Assistant Examiner*—Eileen A. Dunn
*Attorney, Agent, or Firm*—Harness, Dickey & Pierce

[57] ABSTRACT

A propeller shaft for motor vehicles, having an intermediate joint provided in the form of an axially movable universal ball joint and consisting of at least an outer joint part with longitudinally extending first ball tracks, an inner joint part with longitudinally extending second ball tracks and torque transmitting balls guided in radially opposed first and second ball tracks, with the outer joint part being firmly connected to a tubular shaft and with the inner joint part being connected to a shaft journal, and with the inner diameter of the outer joint part or of the adjoining tubular shaft in the region adjoining the free space assumed by the inner joint part in operation during plunging movements in the direction of the tubular shaft being smaller than the outer diameter of the inner joint part.

10 Claims, 5 Drawing Sheets

ENERGY ABSORBING PROPELLER SHAFT FOR MOTOR VEHICLES

BACKGROUND OF THE INVENTION

The invention relates to a propeller shaft for motor vehicles, having an intermediate joint provided in the form of an axially movable universal ball joint and consisting of at least an outer joint part with longitudinally extending first ball tracks, an inner joint part with longitudinally extending second ball tracks and torque transmitting balls guided in radially opposed first and second ball tracks, with the outer joint part being firmly connected to a tubular shaft and with the inner joint part being connected to a shaft journal.

When designing propeller shafts for motor vehicles it is not only necessary to take into account the requirements for normal operating conditions, but also the behaviour of the propeller shaft when a crash occurs, especially in cases of frontal collisions. As far as the latter is concerned, two important requirements have to be met. On the one hand, it must be possible for the shaft to be shortened axially to prevent it from buckling or penetrating the passenger compartment, and on the other hand, it is desirable for the shaft, when being shortened, to absorb a considerable amount of deformation energy.

From the older P 42 24 201.0 there are known propeller shafts of the above-mentioned type wherein, in the outer joint part or in the adjoining tubular shaft, there is provided a stop for the inner joint part axially adjoining the free space occupied under normal operating conditions. As soon as the inner joint part contacts said stop in the case of a crash, the axial connection between the inner joint part and the inserted plug-in shaft journal is broken off, the plug-in shaft journal is pushed through the inner joint part while becoming plastically deformed and again while being plastically deformed, it is pushed into a sleeve welded to or formed on to the outer joint part. There in thus provided an additional component which is adapted to the small diameter of the plug-in shaft journal and which has to absorb the deformation energy.

SUMMARY OF THE INVENTION

With reference to the above, it is the object of the invention to provide a propeller shaft assembly of the initially mentioned type which is simple in design and comprises the smallest possible number of components.

A first solution consists in that the inner diameter of the outer joint part or of the adjoining tubular shaft axially adjoining the free space occupied by the inner joint part in operation during plunging movements, in the direction of the tubular shaft, is smaller than the outer diameter of the inner joint part.

A second solution consists in that the inner diameter of the outer joint part or of the adjoining tubular shaft axially adjoining the free space occupied by a ball cage in operation during plunging movements, in the direction of the tubular shaft, is smaller than the outer diameter of the ball cage and that, either indirectly or directly, there are provided stop elements for delimiting the axial movement between the inner joint part and ball cage.

A further solution consists in that the internal dimensions of the outer joint part or of the adjoining tubular shaft axially adjoining the distance covered by the balls in operation during plunging movements, in the direction of the tubular shaft, are smaller than the outer contour of the balls in their entirety and that, either directly or indirectly, there are provided stop elements for delimiting the axial movement between the balls and the inner joint part.

The design is thus simplified in that the desired deformation takes place in sections of larger diameters either directly at the outer joint part or at the adjoining tubular shaft. There is no need for providing special components which are adapted to the small diameter of the plug-in shaft journal of the inner joint part.

The invention is particularly suitable for outer joint parts which are produced as formed plate metal parts and are formed directly out of the tubular shaft and or are welded to a tubular shaft of the same diameter. To prevent any undesirable displacement of the inner joint part on the shaft journal under high axial loads, it is advantageous either to use an inner joint part with an integrally formed on shaft or to provide a formed-on shaft step constituting a stop for the slid-on inner joint part, which stop supports the inner joint part when increased axial forces occur. If other axial securing means are used between the inner joint part and the shaft journal, such as a securing ring engaging annular grooves in the usual way, these have to be of an adequate thickness to prevent any displacement of the inner joint part on the shaft journal. According to the first said solution, deformation takes place on the outer joint part or on the adjoining tubular shaft as a result of the inner joint part being pressed in. In particular, the latter may be provided with an outer terminal cone. To reverse the situation or in addition, it also possible for a suitable inner tapering cone to be provided on the outer joint part or on the tubular shaft.

According to the second solution, it is possible for deformation to take place as a result of a ball cage being axially pressed into the outer joint part or the tubular shaft, and the cross-section of the inner joint part may be such as to enable to latter, without any resistance, especially with play, to enter the adjoining tubular shaft. It will be necessary, between the inner joint part and the ball cage, to provide axial supporting means which resist the increased axial forces to ensure that the ball cage cannot be separated from the inner joint part due to lack of resistance of their connection.

According to a third solution which can also be applied when the joint does not comprise a ball cage, deformation may be effected at the outer joint part or, possibly, at the adjoining tubular shaft by the axially pressed-in balls. In this case, too, it is necessary to provide end stops for the balls in the inner joint part to allow the balls to be axially moved along by the inner joint part. Again, the inner joint part itself and, if applicable, the ball cage, may be entering the tubular shaft in a resistance-free way, especially with play. However, they may also, additionally, serve as means for deforming the outer joint part and/or the tubular shaft.

In a preferred embodiment, special additional inserts are arranged in the outer joint part or in the adjoining tubular shaft, which inserts, in the case of a crash, may be displaced while absorbing friction energy or which may be deformed and destroyed while absorbing deformation energy, an example being a plate metal cover inserted into the outer joint part by a simple press fit.

Alternatively, circumferentially distributed stamped-in portions may be provided in the outer joint part or in the adjoining tubular shaft, which absorb additional energy. In particular, they may have a variable, e.g. axially increasing depth, thus providing an axially variable, especially increasing resistance against the inserted joint components.

BRIEF DESCRIPTION OF THE DRAWING

A preferred embodiment of the invention will be described with reference to the drawings wherein.

Figure 1:
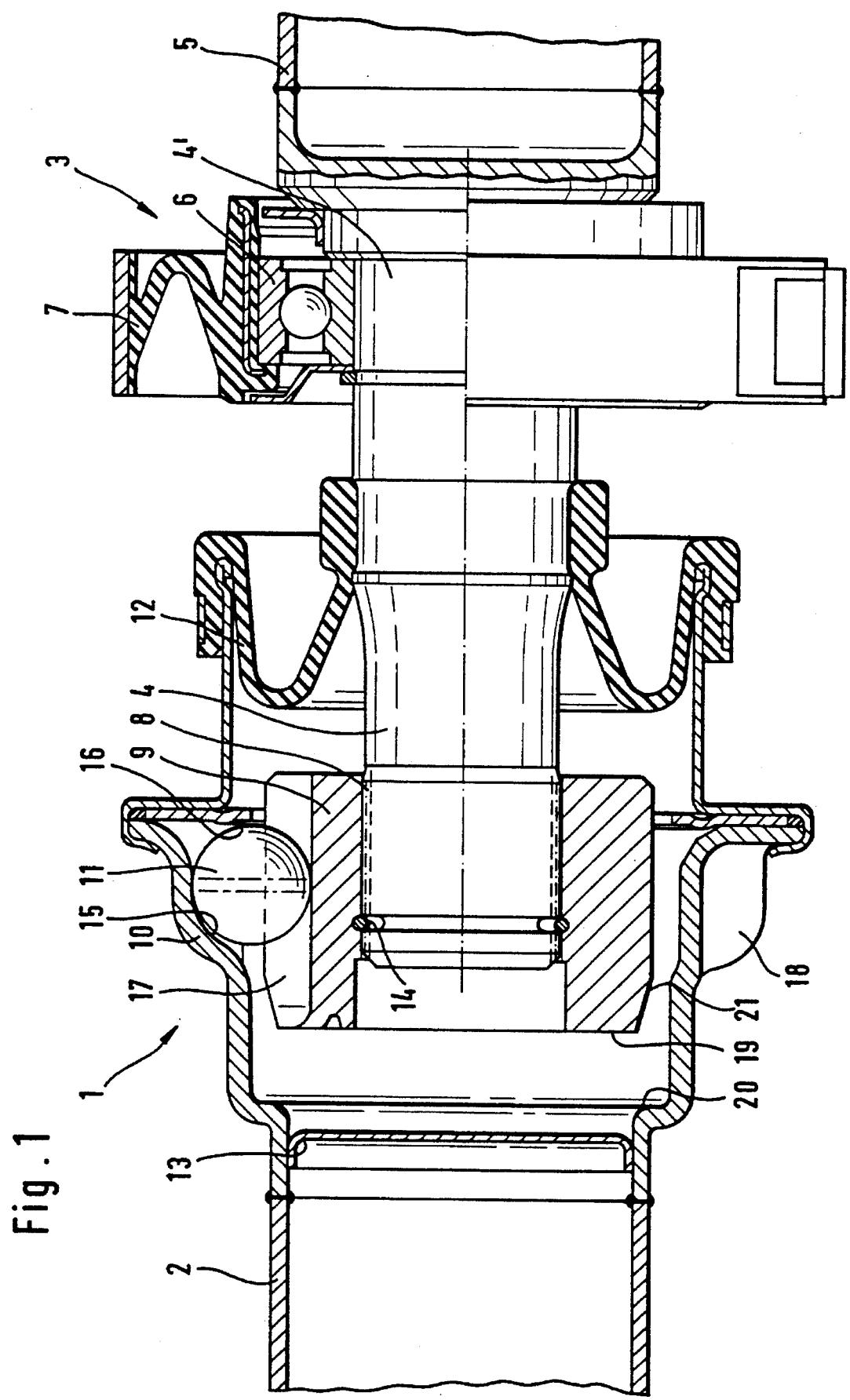
FIG. 1 shows a portion of a propeller shaft in accordance with the invention, having an intermediate bearing and a joint in an operating position.

Below, the two Figures will be described jointly. Each Figure shows a portion of a propeller shaft of a motor vehicle, comprising a universal ball joint 1 having a welded-on first tubular shaft portion 2 and being provided with an intermediate bearing 3 to whose bearing journal 4' there is welded a further tubular shaft portion 5. The bearing journal 4' is supported in a ball bearing 6 which, in turn, is received in a resilient shaft bearing 7 which has to be connected to the vehicle body. The bearing journal 4'0 is produced to be integral with the plug-in journal 4 of the inner joint part 9 of the constant velocity ball joint 1. The non-rotating connection between the inner joint part 9 and the plug-in shaft 4 is effected by shaft toothing 8. The inner joint part 9 comprises ball tracks 17. The Figures also show the deep-drawn outer joint part 10 with further ball tracks 18 and torque transmitting balls 11 held in track pairs 17, 18. The outer joint part 10 and the journal 4 are sealed by a convoluted boot assembly 12. A plate metal cover 13 is pressed into the opposed end of the outer joint part 10. To ensure a firm axial connection between the plug-in journal 4 and the inner joint part, there are provided securing means 14. The balls 11 are axially held relatively tightly with a small amount of play between the stop faces 15 and 16. The axial travel of the balls is indicated in the Figure by two central planes shown to be displaced relative to the actual central plane.

In FIG. 1, the inner joint part 9 is held in an axial central position relative to the balls and thus relative to the outer joint part 10. Any axial displacement of the tubular shaft 2 relative to the tubular shaft 5 and thus of the outer joint part 10 relative to the inner joint part 9 is made possible by the axial length of the ball tracks 17 in the inner joint part. As indicated previously, the balls are hold in ball tracks 18 between the stops 15 and 16, which ball tracks 18 are formed by indentations in the outer joint part 10. The destruction-free plunging path and travel between the two connecting shafts relative to one another are defined by the end face 19 of the inner joint part 9 stopping against an inner step 20 at the outer joint part. Said inner step could also be positioned in the region of the tubular shaft 2.

Figure 2:
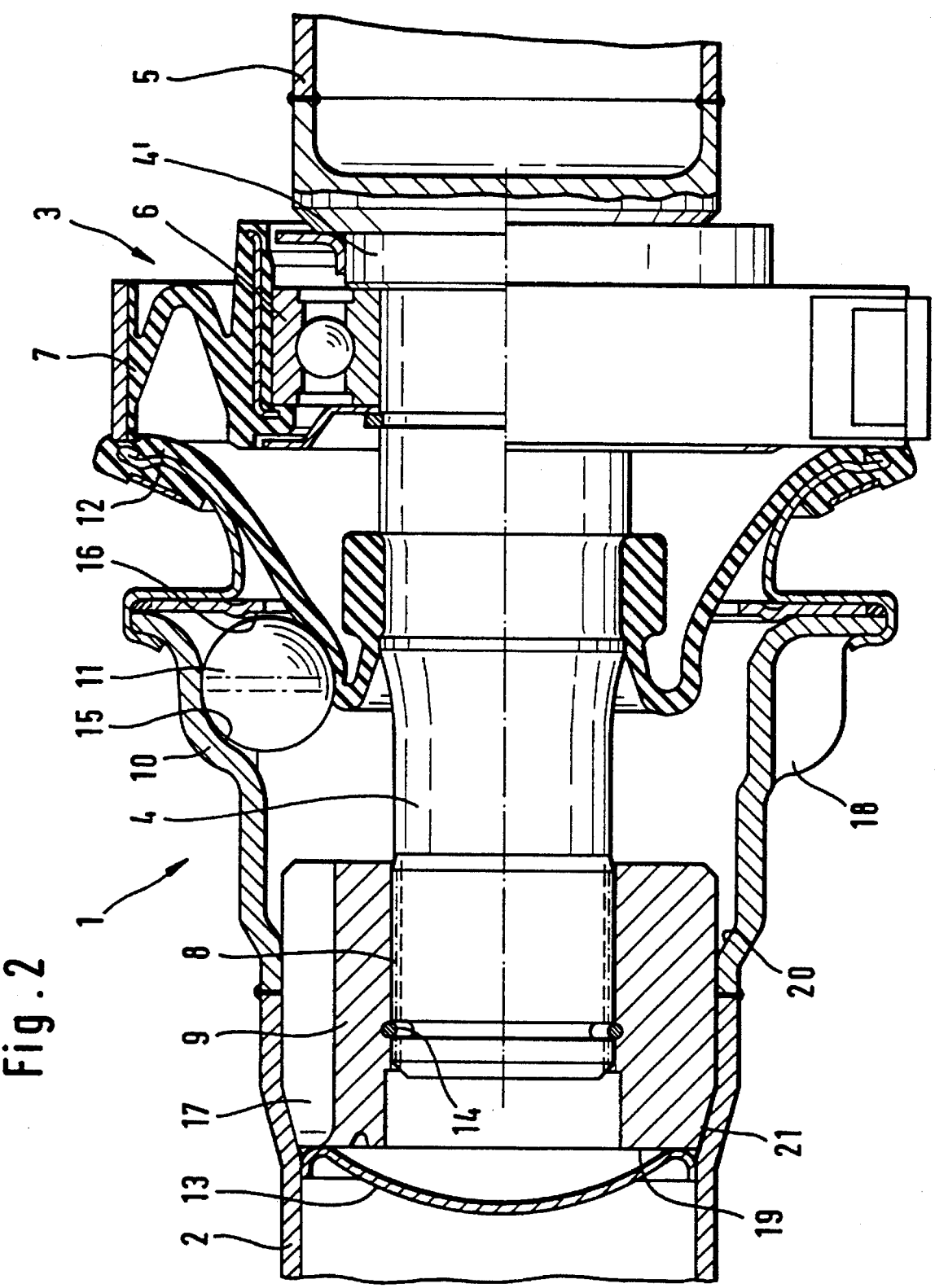
FIG. 2 shows a portion of the propeller shaft according to FIG. 1, in its position during or after a crash, i.e. in an axially shortened condition.

FIG. 2 illustrates the situation with reference to the same portion of the propeller shaft after the above-mentioned maximum destruction-free axial plunging path between the tubular shaft 2 and the tubular shaft 5 has been exceeded. The shaft plug-in journal 4 together with the inner joint part 9 secured thereto has axially moved beyond the stop 20 and penetrated the and of the outer joint part 10 and therebeyond, the beginning of the tubular shaft 2. In the process, the introducing cone 21 has radially deformed the open end of the outer joint part 10 and the tubular shaft 2, and at the same time, it has deformed and displaced the cover 13. The balls 11 have moved out of the ball tracks 17 of the inner joint part 9 at the very beginning of said movement. They are held in their ball tracks 18 only by the deformed boot assembly 12.

Figure 3:
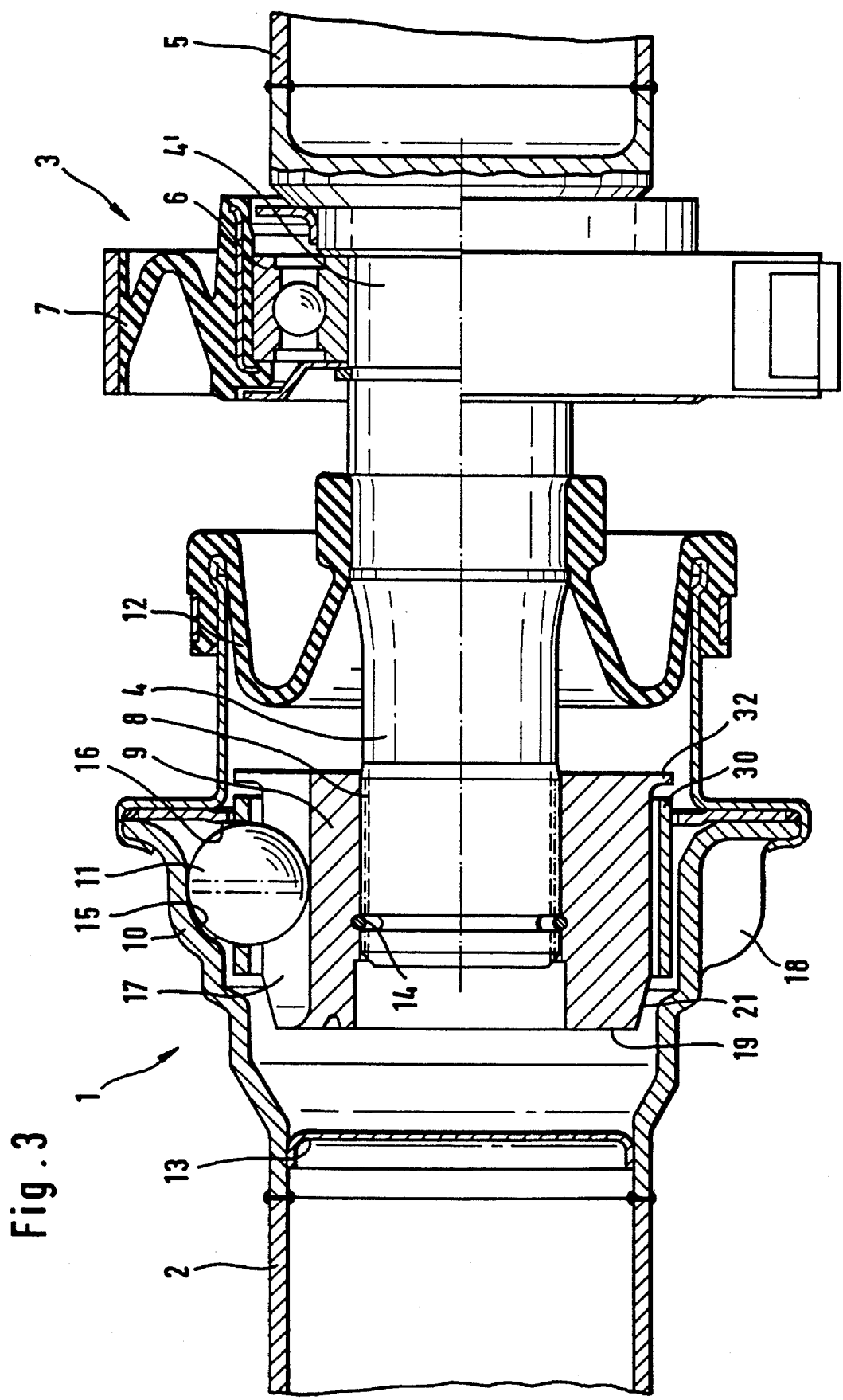
FIG. 3 is a view like that of FIG. 1 of an additional embodiment of the present invention.

FIG. 3 is a view like that of FIG. 1 with the elements which are the same identified with the same reference numerals. In FIG. 3, the free space is occupied by a ball cage 30. The inner diameter of the outer joint part in the direction of the tubular shaft is smaller than the outer diameter of the ball cage. Also, indirectly or directly, stop elements 32 are provided for delimiting the axial movement between the inner joint part and the ball cage.

Figure 4:
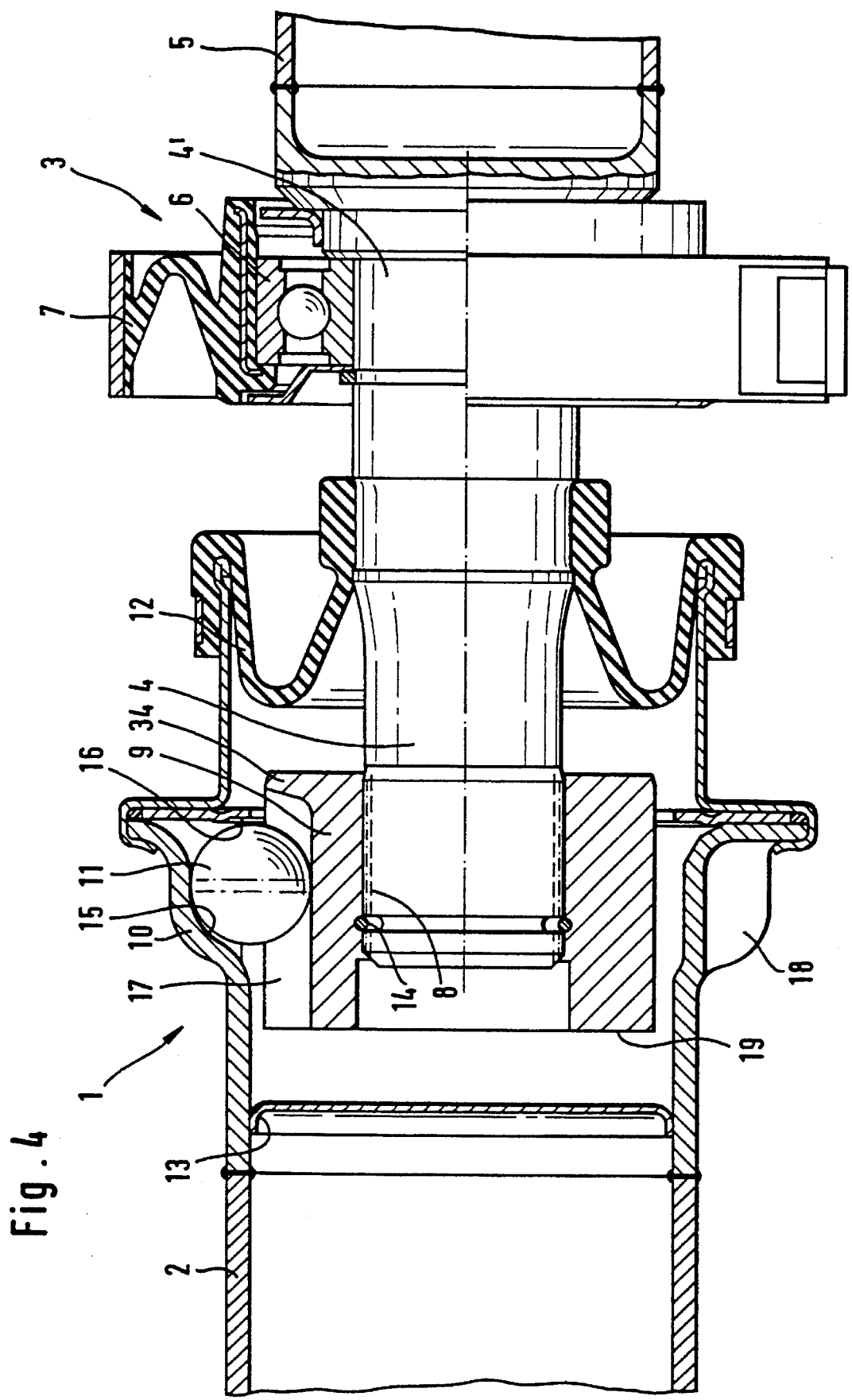
FIG. 4 is a view like that of FIG. 1 of an additional embodiment of the present invention.

In FIG. 4, identical elements are identified with identical numbers. In FIG. 4, stop elements 34 are provided to delimit the axial movement between the balls and the inner joint part.

Figure 5:
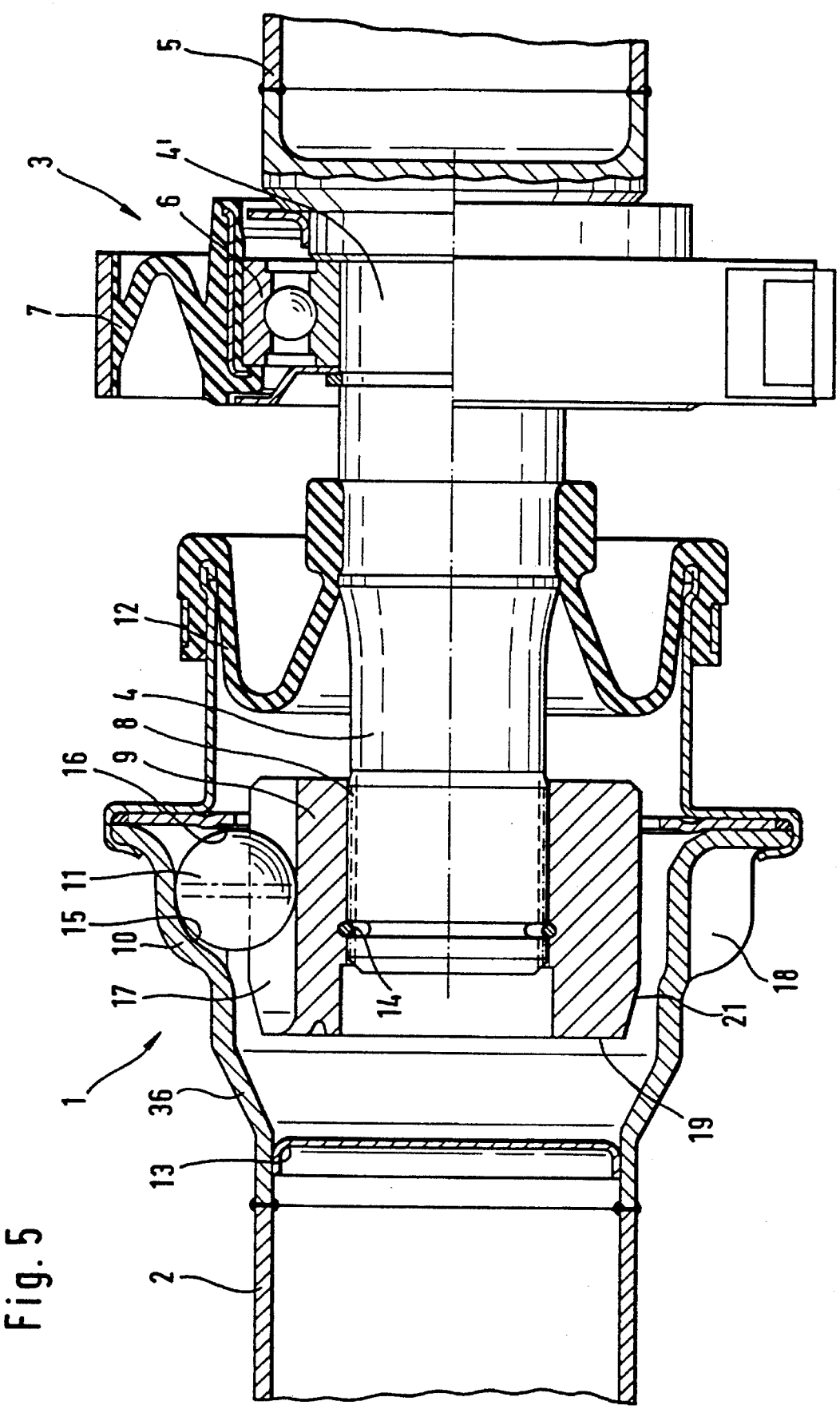
FIG. 5 is a view like that of FIG. 1 of an additional embodiment of the present invention.

In FIG. 5, identical elements are identified with identical reference numerals. The wall of the outer joint part includes an inner conical portion 36 which is tapered in the direction towards the tubular shaft.

If, above, the inner joint part has been referred to as penetrating the outer joint part, it must be mentioned with reference to the arrangement of the ball bearing 6 that the outer joint part and the tubular shaft 2 are actually slid over the bearing journal 4 and the inner joint part 9 because the bearing 6 and the resilient bearing 7 remain substantially stationary relative to the vehicle body. At least, this is how it is illustrated in FIG. 2. Needless to say that the resilient shaft bearing 7, too, because of its design, is capable of being axially deformed so that, in the case of a crash, the tubular shaft 5 can also be displaced to a considerable extent.

I claim:

1. A propeller shaft for motor vehicles comprising:
   an intermediate joint in the form of an axially movable universal ball joint, said intermediate joint including at least an outer joint part with longitudinally extending first ball tracks, an inner joint part with longitudinally extending second ball tracks and torque transmitting balls guided in radially opposed said first and second ball tracks, said outer joint part being firmly connected to a tubular shaft and providing a free space, occupied by the inner joint part in operation during plunging movements in the direction of the tubular shaft, and said inner joint part being connected to a shaft journal, an inner diameter of one of the outer joint part and the adjoining tubular shaft axially adjoining the free space is smaller than an outer diameter of said inner joint part, such that upon plunging movement during a collision, said inner part enters said inner diameter of said outer joint part or tubular shaft deforming said outer joint part or tubular shaft while said outer joint part or tubular shaft absorbing a considerable amount of deformation energy.

2. A propeller shaft according to claim 1 wherein the inner joint part end positioned towards the tubular shaft includes a tapering inner cone.

3. A propeller shaft according to claim 1 wherein a wall of the outer joint part or of the tubular shaft includes an inner conical portion which is tapered in the direction towards the tubular shaft.

4. A propeller shaft according to claim 1 wherein the outer joint part is provided in the form of a plate metal part.

5. A propeller shaft according to claim 1 wherein axial stops are provided for the balls inside the outer joint part, said stops become effective before the inner joint part abuts the outer joint part or the tubular shaft.

6. A propeller shaft according to claim 1 wherein movable or deformable inserts with a predetermined energy absorbing capacity are arranged in the outer joint part.

7. A propeller shaft according to claim 1 wherein movable or deformable inserts with a predetermined energy absorbing capacity are arranged in the tubular shaft.

8. A propeller shaft for motor vehicle comprising:

an intermediate joint in the form of an axially movable universal ball joint, said intermediate joint including at least an outer joint part with longitudinally extending first ball tracks, an inner joint part with longitudinally extending second ball tracks and torque transmitting balls guided in radially opposed said first and second ball tracks and being held in a ball cage, said outer joint part being firmly connected to a tubular shaft and said inner joint part being connected to a shaft journal, an inner diameter of one of the outer joint part and the adjoining tubular shaft axially adjoining a free space, occupied by the ball cage in operation during plunging movements in the direction of the tubular shaft, is smaller than an outer diameter of the ball cage, and stop elements are provided for delimiting the axial movement between the inner joint part and the ball cage, such that upon plunging movement during a collision, said ball cage enters said inner diameter of said outer joint part of tubular shaft deforming said outer joint part or tubular shaft while said outer joint part or tubular shaft absorbing a considerable amount of deformation energy.

9. A propeller shaft according to claim 8 wherein stops for the ball cage are provided in the outer joint part, said stops become effective before the inner joint part abuts the outer joint part of the tubular shaft.

10. A propeller shaft for motor vehicles comprising:

an intermediate joint in the form of an axially movable universal ball joint, said intermediate joint including at least an outer joint part with longitudinally extending first ball tracks, an inner joint part with longitudinally extending second ball tracks and torque transmitting balls guided in radially opposed said first and second ball tracks, said outer joint part being firmly connected to a tubular shaft and said inner joint part being connected to a shaft journal, internal dimensions of one of the outer joint part and the adjoining tubular shaft axially adjoining a distance, covered by the balls in operation during plunging movements in the direction of the tubular shaft, are smaller than the outer contour of the balls in the entirety, and stop elements are provided for delimiting the axial movement between the balls and the inner joint part, such that upon plunging movement during a collision, said balls enter said inner diameter of said outer joint part or tubular shaft deforming said outer joint part or tubular shaft while said outer joint part or tubular shaft absorbing a considerable amount of deformation energy.

* * * * *

UNITED STATES PATENT AND TRADEMARK OFFICE
CERTIFICATE OF CORRECTION

| | | |
|---|---|---|
| PATENT NO. | : | 5,582,546 |
| DATED | : | December 10, 1996 |
| INVENTOR(S) | : | Hans-Heinrich Welschof |

It is certified that error appears in the above-indentified patent and that said Letters Patent is hereby corrected as shown below:

On the title page, under [73] Assignee information, "Lohr" should be --Löhr--

Column 1, line 38, "in" should be --is--

Column 2, line 28, after "it", insert --is--

Column 2, line 35, "to" should be --the--

Column 3, line 21, "4'0" should be --4'--

Column 3, line 44, "hold" should be --held--

Column 3, line 58, "and" should be --end--

Column 5, line 19, Claim 8, "of" should be --or--

Signed and Sealed this

Thirteenth Day of May, 1997

*Attest:*

BRUCE LEHMAN

*Attesting Officer*     *Commissioner of Patents and Trademarks*